(12) United States Patent
Sanders

(10) Patent No.: US 10,546,069 B2
(45) Date of Patent: *Jan. 28, 2020

(54) NATURAL LANGUAGE PROCESSING SYSTEM

(71) Applicant: Dell Products L.P., Round Rock, TX (US)

(72) Inventor: Mark Steven Sanders, Roanoke, VA (US)

(73) Assignee: Dell Products L.P., Round Rock, TX (US)

( * ) Notice: Subject to any disclaimer, the term of this patent is extended or adjusted under 35 U.S.C. 154(b) by 147 days.

This patent is subject to a terminal disclaimer.

(21) Appl. No.: 15/909,793

(22) Filed: Mar. 1, 2018

(65) Prior Publication Data

US 2019/0272327 A1 Sep. 5, 2019

(51) Int. Cl.
*G06F 17/28* (2006.01)
*G10L 15/26* (2006.01)
*G10L 15/22* (2006.01)

(52) U.S. Cl.
CPC .............. *G06F 17/28* (2013.01); *G10L 15/22* (2013.01); *G10L 15/26* (2013.01); *G10L 2015/223* (2013.01)

(58) Field of Classification Search
CPC ... G10L 15/22; G10L 15/26; G10L 2015/223; G06F 17/2785; G06F 17/28; G06F 17/289; G06F 3/167; G06F 17/2735; G06F 17/2705; G06F 17/2765; G06F 17/248; G06F 17/21; G06F 17/218; G06F 17/2881; G06F 16/3322; G06F 16/3329; G06F 16/90332; G06F 16/90344; G06F 17/272

USPC ......................................................... 704/503
See application file for complete search history.

(56) References Cited

U.S. PATENT DOCUMENTS

| | | | |
|---|---|---|---|
| 6,801,897 B2 * | 10/2004 | Kist | G10L 15/22 704/257 |
| 9,563,659 B2 * | 2/2017 | Boyer | G06F 16/9535 |
| 2007/0185702 A1 * | 8/2007 | Harney | G06F 17/271 704/4 |

(Continued)

OTHER PUBLICATIONS

Mark Steven Sanders, "Natural Language Processing System," U.S. Appl. No. 15/840,931, filed Dec. 13, 2017, 41 Pages.

*Primary Examiner* — Bharatkumar S Shah
(74) *Attorney, Agent, or Firm* — Haynes and Boone, LLP

(57) ABSTRACT

A natural language processing system identifies command elements in a text natural language command and, for each command element, accesses a playlist access matrix and identifies any playlist pointer pairs associated therein with that command element. The natural language processing system then identifies whether a first playlist pointer element in any of those playlist pointer pairs indicates a current playlist pointer best match and, if so, updates a playlist entry identifier with a second playlist pointer element in the playlist pointer pair that includes that first playlist pointer element. When the natural language processing system determines that all of the command elements have been considered, it uses the playlist entry identifier to identify a computing language command in a command playlist, and executes the computing language command on a target element in the text natural language command based on an action element in the text natural language command.

20 Claims, 8 Drawing Sheets

(56) References Cited

U.S. PATENT DOCUMENTS

| | | | |
|---|---|---|---|
| 2015/0143394 A1* | 5/2015 | Hijikata | H04N 21/45457 725/14 |
| 2015/0279366 A1* | 10/2015 | Krestnikov | H04W 4/70 704/235 |
| 2016/0057181 A1* | 2/2016 | Henning | H04L 65/403 715/753 |
| 2016/0098638 A1* | 4/2016 | Boyer | G06F 16/9535 706/11 |
| 2016/0098937 A1* | 4/2016 | Boyer | G06F 16/9535 434/350 |

* cited by examiner

| Entry | Command Name | Command Instructions |
|---|---|---|
| 1 | Show running configuration | show running-config |
| 2 | Show startup configuration | show startup-config |
| 3 | Show boot variables | show bootvar |
| 4 | Show boot system | show boot system |
| 5 | Show OS version | show os-version |
| 6 | Show version | show version |
| 7 | Show filesystems | show file-systems |
| 8 | Show inventory | show inventory |
| 9 | Show media | show inventory media |
| 10 | Show all inventory | show inventory show inventory media |
| 11 | Show CPU traffic | show cpu-traffic-stats |
| 12 | Show tech support | show tech-support |
| 13 | Show command history | show command-history |
| 14 | Show system | show system |

NATURAL LANGUAGE PROCESSING DATABASE(S) 400

FIG. 4

NATURAL LANGUAGE PROCESSING SYSTEM

BACKGROUND

The present disclosure relates generally to information handling systems, and more particularly to a natural language processing system that provides for the control of information handling systems via commands provided using natural language.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is becoming increasingly prevalent to control information handling systems via the use of natural language, and a variety of information handling systems are being introduced that utilize natural language in their operation. For example, televisions, phones, lighting systems, security systems, other automation systems, customer help systems, and/or other natural language processing systems allow users to provide commands via natural language (rather than defined computing languages), and then convert those commands to computing languages for execution. One specific example of home automation systems include devices that utilize spoken natural language such as the AMAZON 6 ECHO® from AMAZON.COM® Inc. of Seattle, Wash., United States, the GOGGLE® HOME® from GOGGLE® Inc. of Mountain View, Calif., United States, and APPLE HOMEPOD® from APPLE® of Cupertino, Calif., United States. These devices operate to record spoken natural language command following the detection of an activation phrase (e.g., "ALEXA®" for the AMAZON® ECHO®, "HEY GOOGLE®" for the GOGGLE® HOME®, and "SIRI®" for the APPLE® HOMEPOD®), and then send that recording over the Internet to a natural language processing server system, which converts that recorded spoken natural language command to a text natural language command, and matches the entire text natural language command to an associated action. That action may then be carried out by the natural language processing server system to, for example, purchase a product (e.g., in response to a natural language command "buy more soap"), provided back to the device for execution (e.g., in response to a natural language command "turn the lights off"), and/or execute that action in a variety of manners that would be apparent to one of skill in the art in possession of the present disclosure. Similarly, customer help systems may allow a user to type a text query using natural language, and may utilize similar conventional natural language processing (e.g., match the entire text natural language command to an action) to return a result for that query.

Such conventional natural language processing systems require relatively large language ontology databases in order to determine the best match of a natural language command to an action, and those databases grow quickly when artificial intelligence is used to allow the natural language processing system to learn new natural language commands and their associated actions, provide more accurate action matches for any given natural language command, as well as provide the database with information that allows the natural language processing system to understand different parts of speech. As such, sophisticated natural language processing is currently provided via the cloud/network-based systems discussed above, as the requirement of a significant amount of storage to hold the always growing language ontology databases that increase the accuracy of natural language processing is not feasible for most local devices.

Solutions to these issues were developed by the inventor of the present disclosure, and are described in U.S. patent application Ser. No. 15/840,931, filed on Dec. 13, 2017, entitled "Natural Language Processing System", the disclosure of which is incorporated by reference herein in its entirety. As described in detail in that disclosure, those solutions operate to analyze natural language commands to identify action elements, target elements, and command elements, and for each command element in the natural language command, a playlist action matrix is accessed and iteratively checked to identify a playlist pointer in that playlist access matrix that indicates a best matching command element relative to the other command elements in the natural language command. When the playlist action matrix has been iterated through for all of the command elements in the natural language command, the playlist pointer that indicated the best match is used to identify the computing language command in a command playlist, and that computing language command is executed on the target element based on the action element. However, while these techniques provide benefits over conventional natural language processing systems by enabling accurate results with reduced database sizes, the inventor of that disclosure and the present disclosure has determined that different phrasing and/or word placement in natural language commands that are intended to accomplish the same result (e.g., "I want to show the system os version information for network switch one" vs. "I want to show the version of the system os for network switch one") may produce different results, which is undesirable.

Accordingly, it would be desirable to provide an improved natural language processing system.

SUMMARY

According to one embodiment, an Information Handling System (IHS) includes a processing system; and a memory system that is coupled to the processing system and that includes instructions that, when executed by the processing system cause the processing system to provide a natural language processing engine that is configured to: identify at least one command element in a text natural language command that is also included in a playlist access matrix and, for each command element that is identified and in the order it appears in the text natural language command: access the playlist access matrix based on that command element; determine whether at least one playlist pointer pair is associated with that command element in the playlist access matrix; identify, in response to determining that the at least one playlist pointer pair is associated with that command element in the playlist access matrix, whether a first playlist pointer element in any of those at least one playlist pointer pairs indicates a current playlist pointer best match; and update, in response to determining that the first playlist pointer element is a current playlist pointer best match, a playlist entry identifier with a second playlist pointer element in the playlist pointer pair that includes the first playlist pointer element; determine that all of the command elements have been considered in the text natural language command; use the playlist entry identifier to identify a computing language command in a command playlist; and execute the computing language command on a target element that is included in the text natural language command based on an action element that is included in the text natural language command.

BRIEF DESCRIPTION OF THE DRAWINGS

FIG. 4 is a schematic view illustrating an embodiment of a command playlist stored in natural language processing database that may be provided in the natural language processing system of FIG. 2.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
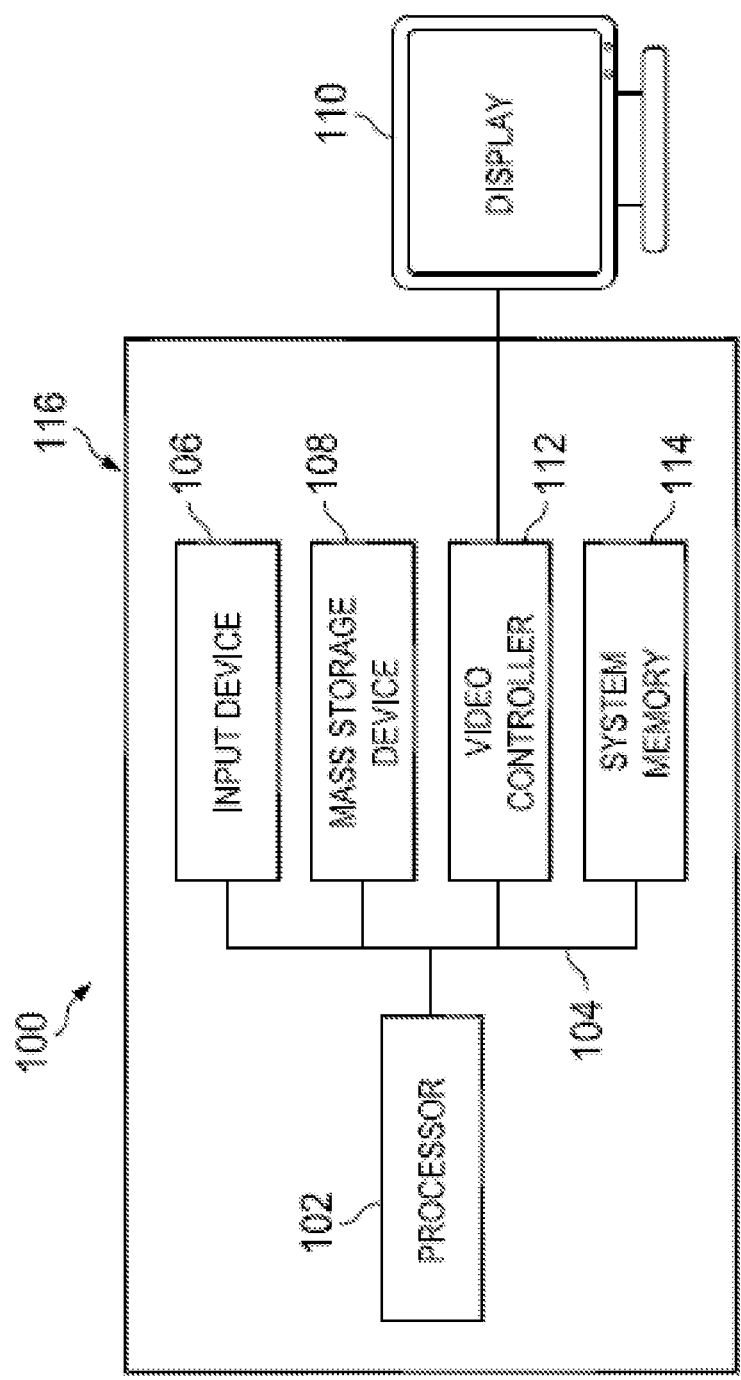
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
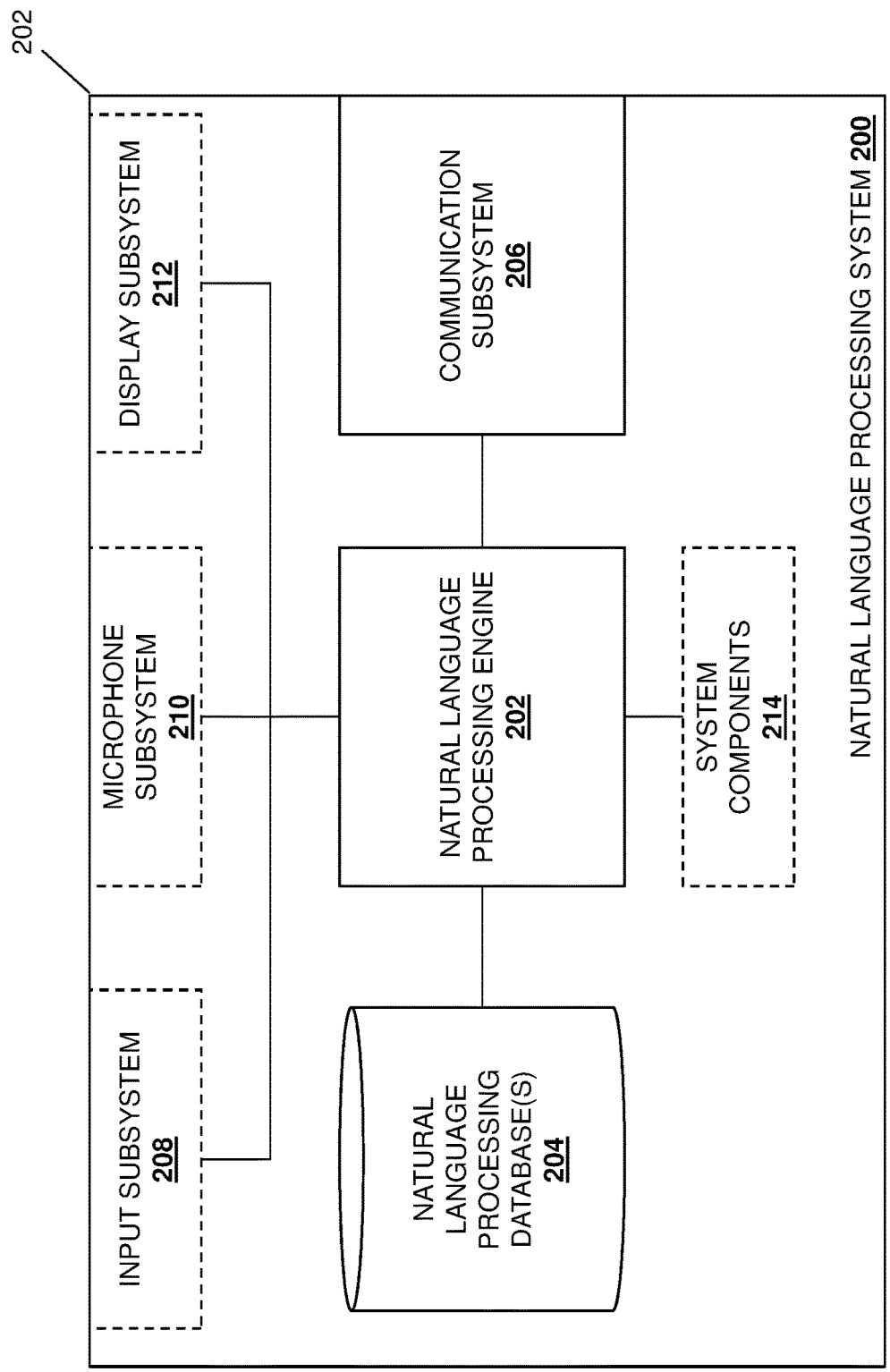
FIG. 2 is a schematic view illustrating an embodiment of a natural language processing system.

Referring now to FIG. 2, an embodiment of a natural language processing system 200 is illustrated that may be provided by the IHS 100 discussed above with reference to FIG. 1, and/or that may include some or all of the components of the IHS 100. In some of the embodiments discussed below, the natural language processing system 200 of the present disclosure is a voice activated assistant device that is similar to the AMAZON 6 ECHO® from AMAZON.COM® Inc. of Seattle, Wash., United States, the GOGGLE® HOME® from GOGGLE® Inc. of Mountain View, Calif., United States, and APPLE HOMEPOD® from APPLE® of Cupertino, Calif., United States. However, as discussed herein, the natural language processing system 200 may be provided as part of a network-attached server system that is configured to communicate through the network with any number of voice-activated assistant devices while remaining within the scope of the present disclosure. As such, in FIG. 2, the natural language processing system 200 includes a chassis 202 that houses the components of the natural language processing system 200, only some of which are illustrated in FIG. 2. For example, the chassis 200 may house a processing system (not illustrated, but which may include the processor 102 discussed above with reference to FIG. 1) and a memory system (not illustrated, but which may include the memory 114 discussed above with reference to FIG. 1) that is coupled to the processor and that includes instructions that, when executed by the processing system, cause the processing system to provide a natural language processing engine 202 that is configured to perform the functions of the natural language processing engines and natural language processing systems discussed below.

The chassis 202 may also house a storage system (not illustrated, but which may include the storage device 108 discussed above with reference to FIG. 1) that is coupled to the natural language processing engine 202 (e.g., via a coupling between the storage system and the processing system) and that includes one or more natural language processing databases 204 that are configured to store to store the information discussed below, as well as any other information that one of skill in the art would recognize would allow for the functionality discussed below. While the one or more natural language processing databases 204 are illustrated as located in the chassis 202, one of skill in the art in possession of the present disclosure will recognize that the storage systems and database(s) therein may be coupled to the natural language processing engine 202 through a network while remaining within the scope of the present disclosure. The chassis 202 may also house a communication subsystem 206 that is coupled to the natural language processing engine 202 (e.g., via a coupling between the communication subsystem 206 and the processing system) and that may includes a Network Interface Controller (NIC), a wireless communication subsystem (e.g., a BLUETOOTH® communication subsystem, a Near Field Communication (NFC) subsystem, a WiFi communication subsystem), and/or any other communication components that would be apparent to one of skill in the art.

The chassis 202 may also house an optional input subsystem 208 that is coupled to the natural language processing engine 202 (e.g., via a coupling between the input subsystem 208 and the processing system) and that may include, for example, a keyboard, a mouse, a touchpad, a touchscreen, and/or other input subsystems known in the art. The chassis 202 may also house an optional microphone subsystem 210 that is coupled to the natural language processing engine 202 (e.g., via a coupling between the microphone subsystem 210 and the processing system) and that may include one or more microphones, microphone arrays, and/or any other audio capturing components known in the art. The chassis 202 may also house an optional display subsystem 212 that is coupled to the natural language processing engine 202 (e.g., via a coupling between the display subsystem 212 and the processing system) and that may be integrated with the optional input subsystem 208 (e.g., as a touchscreen/touch input display device) and/or include any of a variety of display components known in the art. The chassis 202 may also house a variety of other optional system components 214 that may be coupled to the natural language processing engine 202 (e.g., via a coupling between the system components 214 and the processing system) and controllable by the natural language processing engine 202 as discussed below. For example, in some of the examples provided below, the natural language processing system 200 is provided as part of a networking switch device, and the natural language processing engine 202 is configured to monitor and/or control the system components 214 in that networking switch device.

One of skill in the art in possession of the present disclosure will recognize that the optional subsystems and components illustrated in FIG. 2 may be provided in the chassis 202 of a voice activated assistant device similar to the AMAZON® ECHO®, GOOGLE® HOME®, and APPLE HOMEPOD® devices discussed above, as well as a user computing device such as a desktop computing device, laptop/notebook computing device, tablet computing device, phone, and/or a variety of other computing devices known in the art. Furthermore, one of skill in the art in possession of the present disclosure will recognize that the optional subsystems and components illustrated in FIG. 2 may be omitted from natural language processing systems such as the network connected server systems described herein. However, while several specific embodiments of the natural language processing system 200 have been described, one of skill in the art in possession of the present disclosure will recognize that natural language processing systems and computing systems may include a variety of other components and/or components configurations for providing conventional natural language processing device functionality and computing device functionality, as well as the functionality discussed below, while remaining within the scope of the present disclosure.

Figure 3:
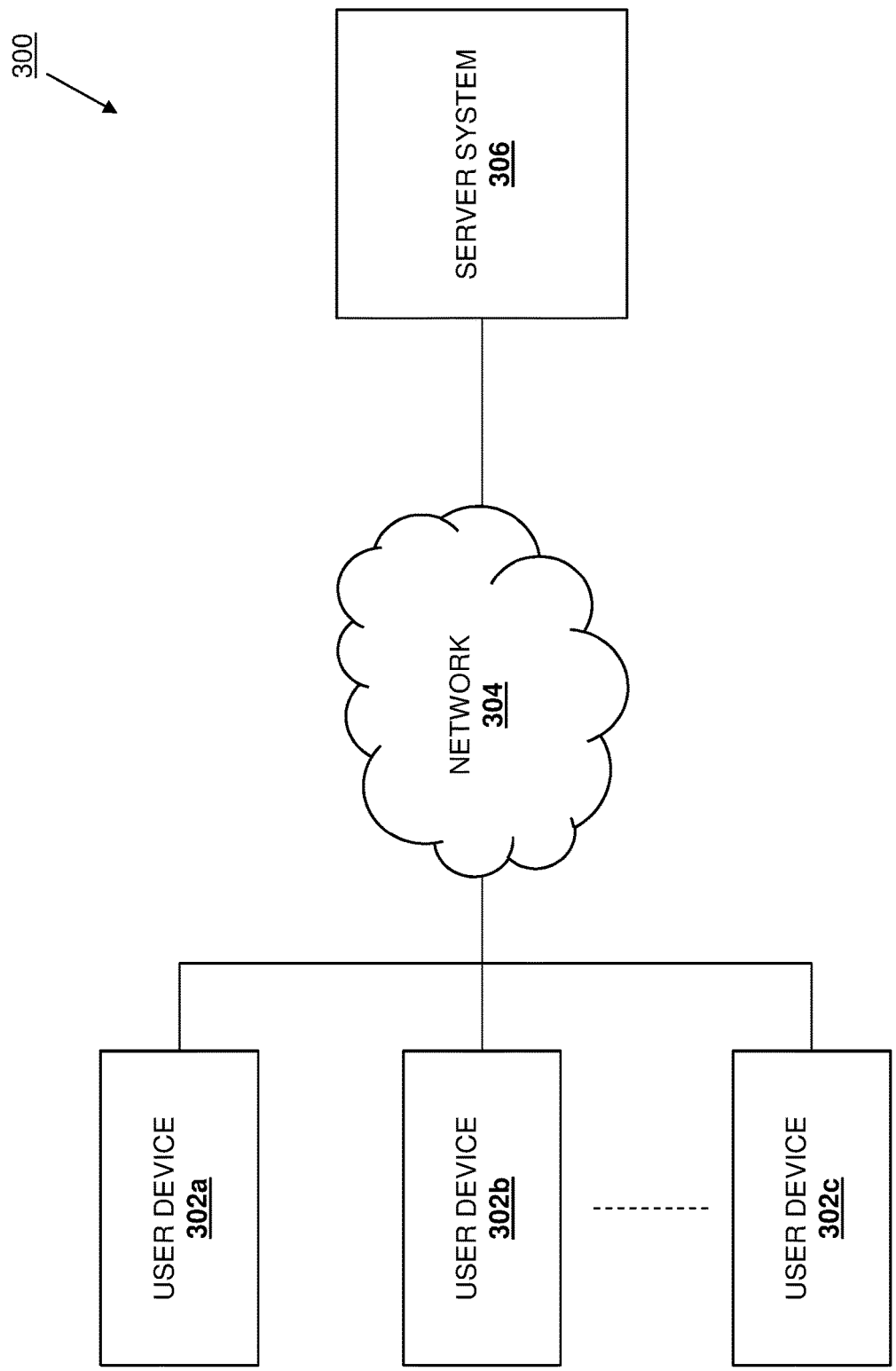
FIG. 3 is a schematic view illustrating an embodiment of a networked system that may utilize the natural language processing system of FIG. 2.

Referring now to FIG. 3, an embodiment of a networked system 300 is illustrated. In the illustrated embodiment, the networked system 300 includes a plurality of user devices 302a, 302b, and up to 302c, any of which may be provided by the IHS 100 discussed above with reference to FIG. 1, and/or which may include some or all of the components of the IHS 100. The user devices 302a-c are coupled to a network 304 such as, for example, the Internet, although other networks will fall within the scope of the present disclosure as well. A server system 306 is also coupled to the network 304, and may be provided by one or more of the IHS 100 discussed above with reference to FIG. 1, or may include some or all of the components of the IHS 100. In some of the embodiments discussed below, any or all of the user devices 302a-c may be provided by the natural language processing system 200 of FIG. 2 (e.g., a natural language processing device including some or all of the optional subsystems and components in the chassis 202), and may operate by themselves and/or via communication with the server system 306 via the network 304 in a variety of different manners discussed below. In some of the embodiments discussed below, any or all of the user devices 302a-c may be provided by the voice activated assistant devices discussed above, the server system 306 may be provided by the natural language processing system 200 of FIG. 2 (e.g., without some or all of the optional subsystems and components illustrated in FIG. 2) and may operate via communication with the user devices 302a-c via the network 304 in a variety of different manners discussed below. However, while a specific networked system 300 and several embodiments of its operation are illustrated and described herein, one of skill in the art in possession of the present disclosure will recognize that networked systems may include a variety of components and component configuration and may operate in a variety of manners that will fall within the scope of the present disclosure as well.

Referring now to FIG. 4, an embodiment of one or more natural language processing databases 400 is illustrated that may be the one or more natural language processing databases 204 discussed above with reference to FIG. 2. In the illustrated embodiment, the natural language processing database(s) 400 include a command playlist having an entry column 404, a command name column 406, and a command instructions column 408, and each row of the command playlist 402 includes an enumerated entry in the entry column 404, along with a corresponding command name for that entry in the command name column 406, and command instructions for that entry in the command instructions column 408. One of skill in the art in possession of the present disclosure will recognize that command names in the command name column 406 include natural language elements, while the command instructions in the command instructions column 408 include computing language elements. However, other formats for command playlists that provide the functionality discussed below are envisioned as falling within the scope of the present disclosure as well.

Furthermore, one of skill in the art in possession of the present disclosure will recognize that the command playlist 402 includes commands for a networking switch device discussed in the examples below, but commands for virtually any device and/or application of a natural language processing system are envisioned as falling within the scope of the present disclosure as well.

Thus, as can be seen in the specific example provided in FIG. 4, entry 1 in the first row of the command playlist 402 includes a "Show running configuration" in the command name column 406 and "show running-config" in the command instruction column 408, entry 2 in the first row of the command playlist 402 includes a "Show startup configuration" in the command name column 406 and "show startup-config" in the command instruction column 408, entry 3 in the first row of the command playlist 402 includes a "Show boot variables" in the command name column 406 and "show bootvar" in the command instruction column 408, entry 4 in the first row of the command playlist 402 includes a "Show boot system" in the command name column 406 and "show boot system" in the command instruction column 408, entry 5 in the first row of the command playlist 402 includes a "Show OS version" in the command name column 406 and "show os-version" in the command instruction column 408, entry 6 in the first row of the command playlist 402 includes a "Show version" in the command name column 406 and "show version" in the command instruction column 408, entry 7 in the first row of the command playlist 402 includes a "Show filesystems" in the command name column 406 and "show file-systems" in the command instruction column 408, entry 8 in the first row of the command playlist 402 includes a "Show inventory" in the command name column 406 and "show inventory media" in the command instruction column 408, entry 9 in the first row of the command playlist 402 includes a "Show inventory" in the command name column 406 and "show inventory" in the command instruction column 408, entry 10 in the first row of the command playlist 402 includes a "Show all inventory" in the command name column 406 and "show inventory" and "show inventory media" in the command instruction column 408, entry 11 in the first row of the command playlist 402 includes a "Show CPU traffic" in the command name column 406 and "show cpu-traffic-stats" in the command instruction column 408, entry 12 in the first row of the command playlist 402 includes a "Show tech support" in the command name column 406 and "show tech-support" in the command instruction column 408, entry 13 in the first row of the command playlist 402 includes a "Show command history" in the command name column 406 and "show command-history" in the command instruction column 408, and entry 14 in the first row of the command playlist 402 includes a "Show system" in the command name column 406 and "show system" in the command instruction column 408.

One of skill in the art in possession of the present disclosure will recognize that the illustrated embodiment of the command playlist 402 in FIG. 2 provides a specific example of a command playlist associated with a "show" action, and that other actions may be included in the command playlist, and/or the natural language processing database 400 may include other command playlists for actions other than the show action. For example, actions for the networking switch device in the examples below may include "get", "determine", "view", "retrieve", "examine", "verify", "display", "check", "review", "see", "give", "dump", "fetch", and/or any other action that would be apparent to one of skill in the art in possession of the present disclosure, and those action may be represented by entries in the command playlist 402, and/or in entries in other command playlists included in the natural language processing database(s).

Figure 5:
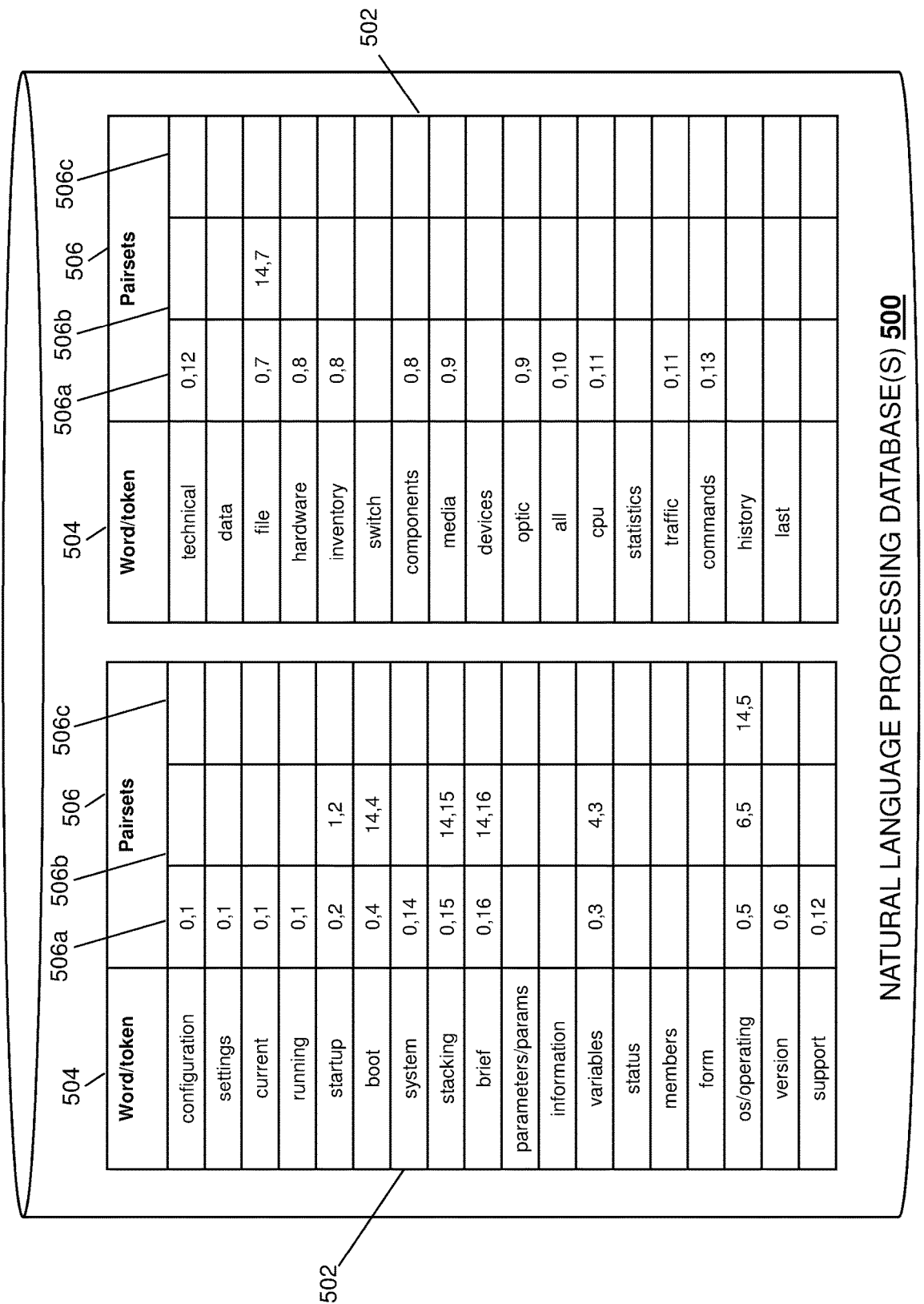
FIG. 5 is a schematic view illustrating an embodiment of a playlist access matrix stored in natural language processing database that may be provided in the natural language processing system of FIG. 2.

Referring now to FIG. 5, an embodiment of one or more natural language processing databases 500 is illustrated that may be the one or more natural language processing databases 204 discussed above with reference to FIG. 2. In the illustrated embodiment, the natural language processing database(s) 500 include a playlist access matrix 502 having word/token column 504 and a pairset column 506 that includes a plurality of pairset sub-columns 506a, 506b, and 506c. As can be seen in FIG. 5, each row of the playlist access matrix 502 includes a word/token in the entry column 504, and may include playlist pointer pair(s) in any of the pairset sub-columns 506a-c. One of skill in the art in possession of the present disclosure will recognize that word/tokens in the word/token column 504 include natural language elements and, as discussed below, the playlist pointer pair(s) are configured to provide reference(s) to the command playlist 402 based on a current access and a previous access of the playlist access matrix 502 for a given natural language command. Furthermore, one of skill in the art in possession of the present disclosure will recognize that some natural language elements (e.g., "information") may be so broadly utilized with a system associated with the playlist access matrix 502 that they give little to no indication of the intent of the natural language command or natural language command element, and thus may have no playlist pointer pair(s) in any of their associated pairset sub-column(s) 506a-c. However, while a specific playlist access matrix has been described, other formats for playlist access matrices that provide the functionality discussed below are envisioned as falling within the scope of the present disclosure as well. Furthermore, one of skill in the art in possession of the present disclosure will recognize that the playlist access matrix 502 includes words/tokens for natural language commands provided for the networking switch device in the examples below, but words/tokens for virtually any device and/or application of a natural language processing system are envisioned as falling within the scope of the present disclosure as well.

Below is an example of a portion of a JavaScript Object Notation (JSON) syntax playlist access matrix file format that may be utilized in providing the command playlist(s) and playlist access matrix discussed herein:

```
{
    "version" : 1,
    "actions" : [
        "get",
        "determine",
        "view",
        "retrieve",
        "examine",
        "verify",
        "show",
        "display",
        "check",
        "review",
        "see",
        "give",
        "dump",
        "fetch"
    ],
    "reserved" : [
        "direct",
        "connect",
        "disconnect"
```

-continued

```
    ],
    "matrix" : [
        { "word" : "running", "mapper" : [{ "Mp": 0, "Mn" : 1} ] },
        { "word" : "configuration", "mapper" : [{ "Mp": 0,
        "Mn" : 1} ] },
        {...},
        { "word" : "startup", "mapper" : [{ "Mp": 0, "Mn" : 2},
                                          { "Mp" : 1, "Mn" : 2} ] },
        {...},
    ]
}
```

One of skill in the art in possession of the present disclosure will recognize that, in the example provided above, the "actions" portion of the JSON-syntax playlist access matrix file format may corresponds to actions provided in the command playlists described herein (e.g., the "show" action for the "show" command playlist 402 discussed above), and the reserved portion of the JSON-syntax playlist access matrix file format corresponds to natural language that may be reserved in order to allow a user to directly connect to the natural language processing system to input data manually and without the natural language processing functionality described here (e.g., "I would like to perform a direct connect to the system"). Furthermore, one of skill in the art in possession of the present disclosure will recognize that the example of the "matrix" portion of the JSON-syntax playlist access matrix file format corresponds to the entries in the playlist access matrix 502. However, while a specific example has been provided, one of skill in the art in possession of the present disclosure will recognize that a variety of programming languages and/or file formats may be utilized to provide the command playlist(s), playlist access matrix/matrices, and/or other functionality discussed below while remaining within the scope of the present disclosure.

Figure 7:
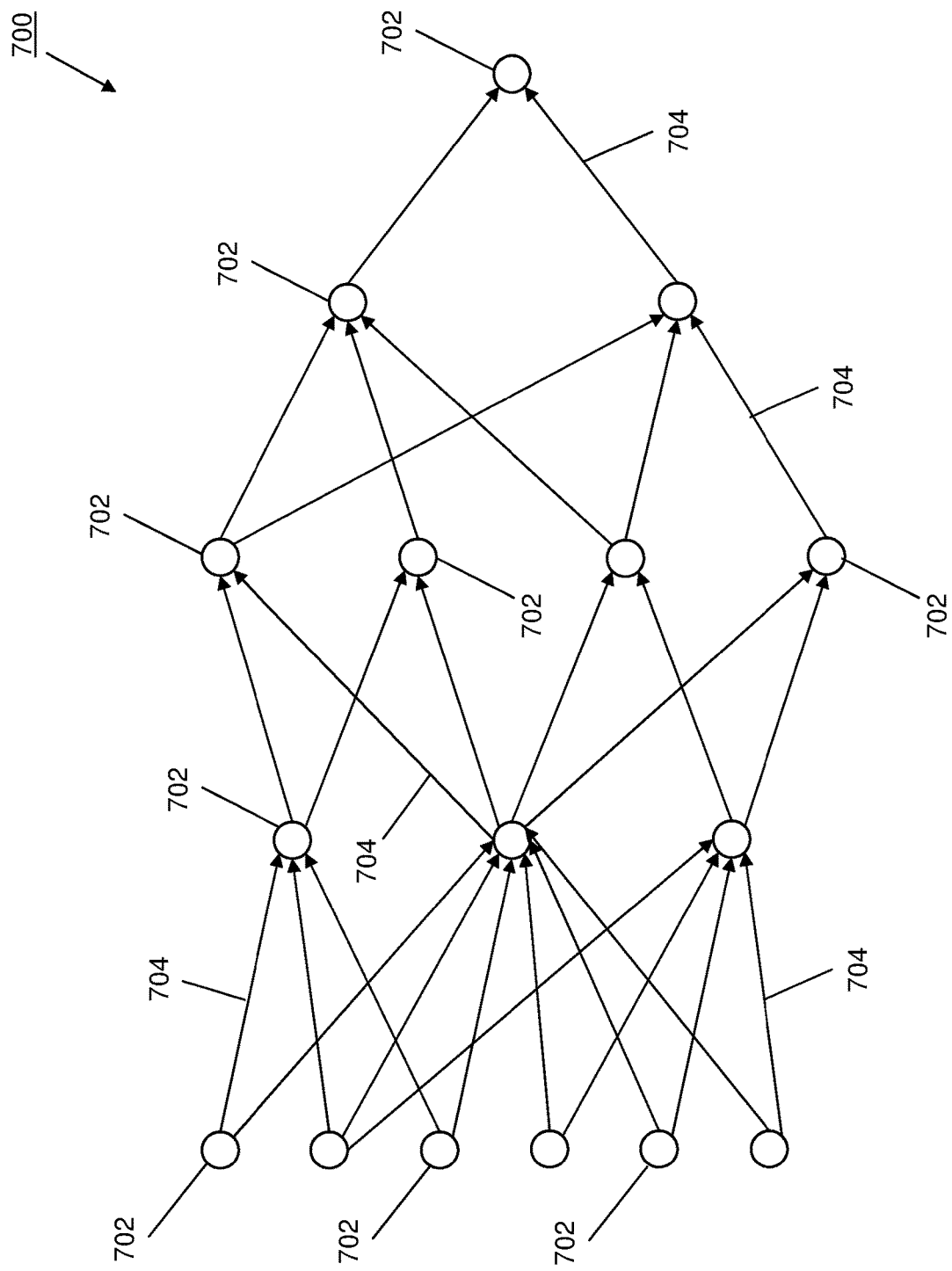
FIG. 7 is a flow chart illustrating an embodiment of an iterative tree parsing flow utilized by the systems and methods of the present disclosure.

In an embodiment, the playlist access matrix 502 may be considered an "iterative tree parsing matrix" that provides a loadable configuration dataset that may be dynamically modified such that new languages, phrases, and/or messages may be learned, with the words/tokens utilized in those languages, phrases, and/or messages appended to the matrix to extend the ability to detect, classify, and act on generalized natural language commands to translate them to direct device commands. With reference to FIG. 7, an iterative tree parsing matrix 700 is illustrated that includes nodes 702 (i.e., the words/tokens in the playlist access matrix 502) that are traversed via one or more links 704 (i.e., the pairsets in the playlist access matrix 502) during an iterative tree parsing flow to update a value of a playlist entry identifier based on a match to the current value of that playlist entry identifier. As described below, iterations of accesses of the playlist access matrix 502 flow through the nodes/words/tokens like a tree to determine the best value for the playlist entry identifier that results in the retrieval of a computing device command for the natural language command under consideration. One of skill in the art in possession of the present disclosure will recognize how such an iterative tree parsing matrix approach will maintain an apriori understanding of the natural language command and how the processing of that natural language command has traversed the nodes of the iterative tree parsing matrix 700 to achieve the best match without producing different results based on the transposition of words in the natural language command.

Figure 6A:
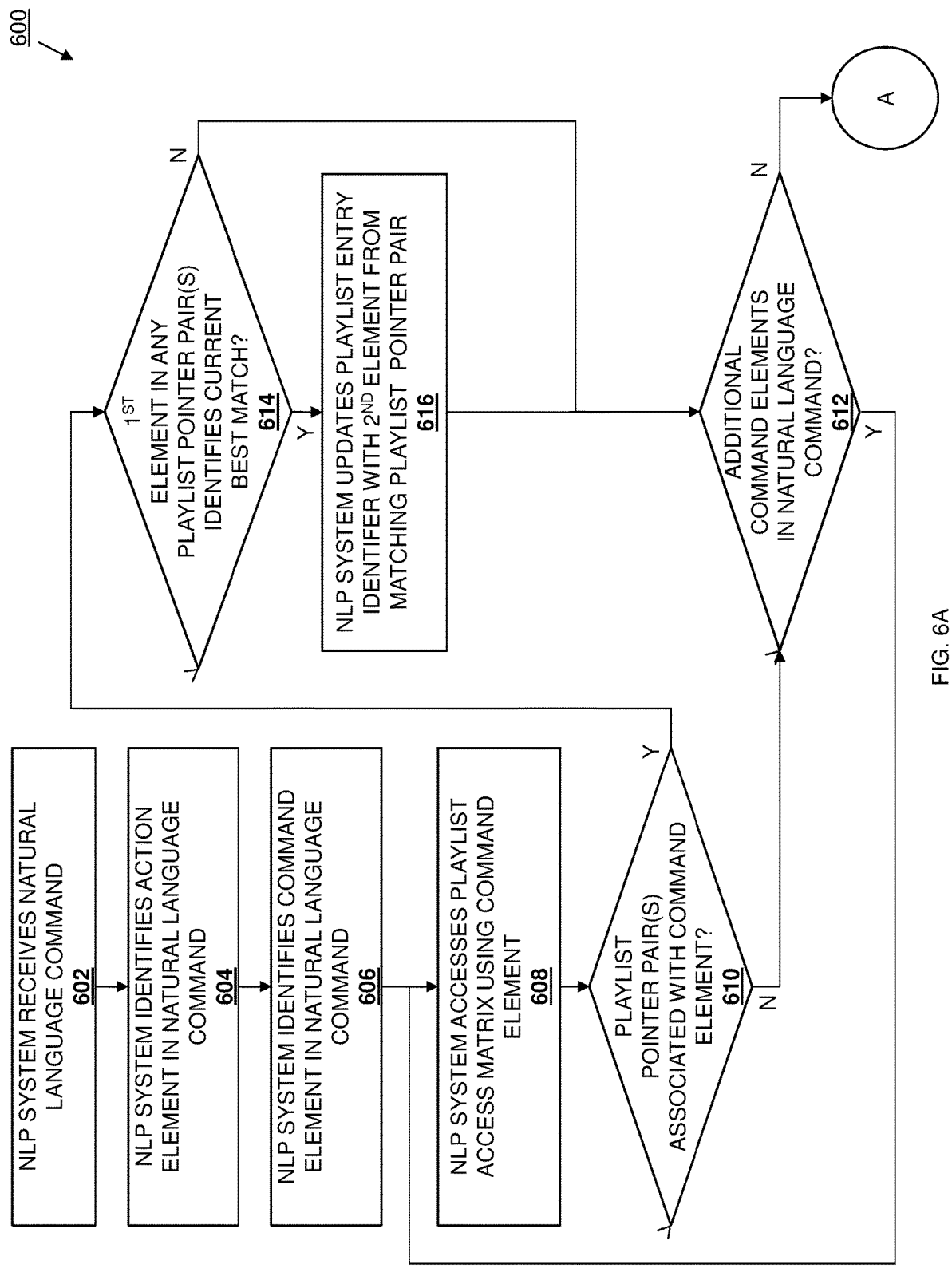
FIG. 6A is a flow chart illustrating an embodiment of a portion of a method for providing natural language processing.
Figure 6B:
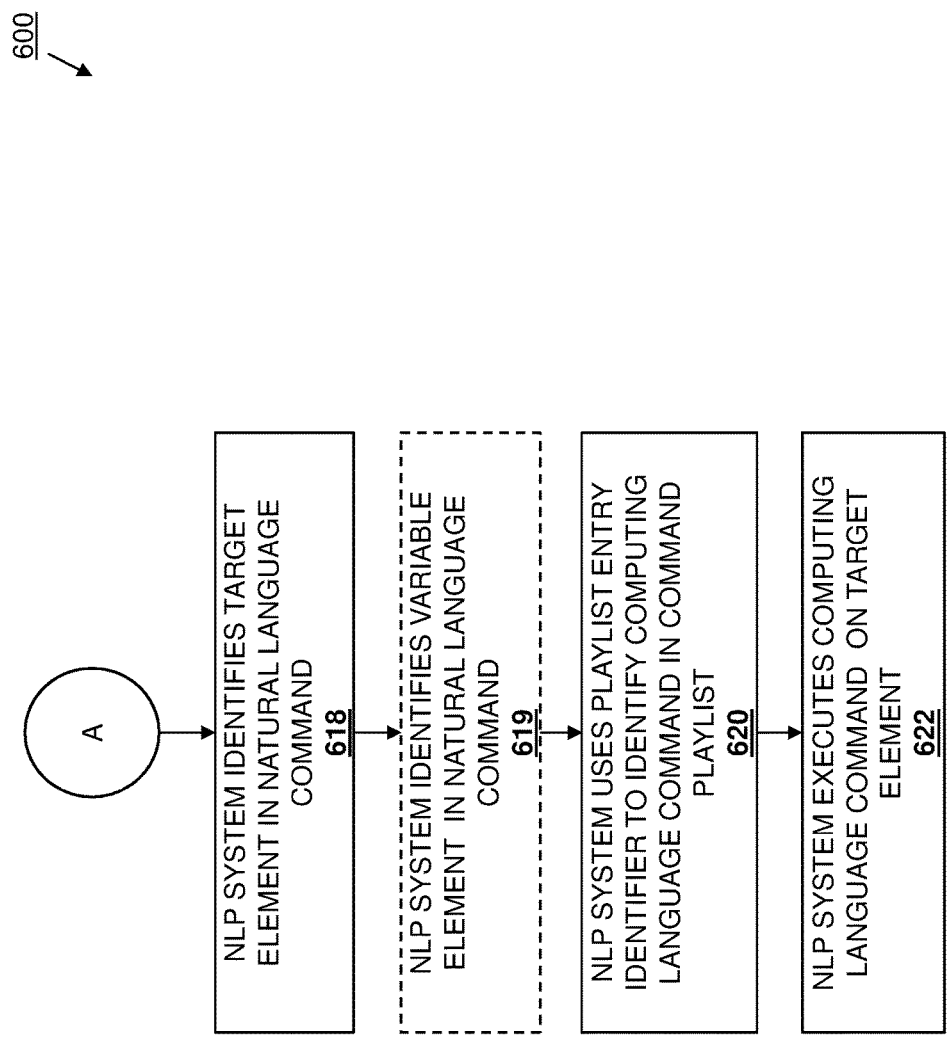
FIG. 6B is a flow chart illustrating an embodiment of a portion of the method for providing natural language processing

Referring now to FIGS. 6A and 6B, an embodiment of a method 600 for natural language processing is illustrated. As discussed below, the systems and methods of the present disclosure replace conventional natural language processing, which is performed using the entire text of natural language commands to perform lookups in very large language ontology databases, with a language classification system that identifies a computing language command based on the determination of matches in a dynamic action-based playlist access matrix that is accessed via the segmentation of natural language commands into words/tokens. At least some of those words/tokens may be used to identify associated playlist pointer pairs that each include a first element that indicates a current playlist pointer best match that references a possible value for a playlist entry identifier that may have been provided in a previous access of the playlist access matrix, and a second element that provides a new value for the playlist entry identifier if the possible value of the first element matches the current value of the existing playlist entry identifier. Thus, the playlist entry identifier may be updated for any word/token in the natural language command with the new value in the second element in an associated playlist pointer pair when the possible value in the first element of that playlist pointer pair matches the current value of the existing playlist entry identifier and, when all of the words/tokens have been considered, the value of the playlist entry identifier is then utilized with a computing command playlist to retrieve a computing language command that corresponds to the natural language command. That computing language command is then executed to provide a result that was requested in the natural language command.

The natural language processing system of the present disclosure may perform a pre-classification process in which an action element, a target element, and any variable elements (if present) in the natural language command are identified, and then command elements in the natural language command are cycled through using the playlist access matrix in order to determine the playlist entry identifier resulting from the command element analysis of the natural language command. Providing for natural language processing in such a manner has been found to substantially reduce the size of the databases needed in order to provide accurate results for natural language commands, enabling the provisioning of such databases locally instead of on network connected server systems, allowing for the performance of natural language processing without network access in situations that call for it.

The method 600 begins at block 602 where a natural language processing system receives a natural language command. In an embodiment, at block 602, the natural language processing engine 202 in the natural language processing system 200 may receive a natural language command in a variety of manners. For example, the natural language processing engine 202 may utilize the microphone subsystem 210 to record a spoken natural language command (e.g., spoken by a user) in response to, for example, detecting an activation command (e.g., "ALEXA®" for the AMAZON 6 ECHO®, "HEY GOOGLE®" for the GOGGLE® HOME®, and "HEY SIRI®" for the APPLE HOMEPOD® devices discussed above), and in some embodiments of block 602, the natural language processing engine 202 may operate to convert the recorded spoken natural language command to a text natural language command using a variety of audio-to-text conversion subsystems known in the art. In another example, the natural language processing engine 202 in the natural language processing system 200 may receive a recorded spoken natural language command from a conventional voice activated assistant device (e.g., from any of the user devices 302a-c via the network 304 when the natural language processing system 200 is provided by the server system 306 in FIG. 3), and may operate to convert the recorded spoken natural language command to a text natural language command using a variety of audio-to-text conversion subsystems known in the art.

In another example, the natural language processing engine 202 in the natural language processing system 200 may receive a text natural language command directly via the input subsystem 208 (e.g., a keyboard), or indirectly through the network 304 (e.g., via any of the user devices 302a-c when the natural language processing engine 202 is provided by the server system 306). While specific examples of the natural language processing system receiving a text natural language command are provided, one of skill in the art in possession of the present disclosure will recognize that any of a variety of combinations of the functionality described below may be performed at block 302 (e.g., one of the user devices 302a-c recording a spoken natural language command and converting it to a text natural language command, and providing that text natural language command through the network 304 to the server system 306) while remaining within the scope of the present disclosure.

In the examples provided below, the text natural language command results from a user speaking or inputting (e.g., via a keyboard or other input subsystem 208) a request to control networking switch device such as "I want to show the system os version information for network switch one" or "I want to show the version of the system os for network switch one". However, one of skill in the art in possession of the present disclosure will recognize that the spoken or text natural language command received at block 602 may include virtually any natural language command known in the art, and the natural language processing database(s) 204 in the natural language processing system 200 may be provided information to allow for the processing of those natural language commands in a similar manner to that described below.

The method 600 then proceeds to block 604 where the natural language processing system identifies an action element in the natural language command. In an embodiment, at or prior to block 604, the natural language processing engine 202 may begin a natural language command pre-classification process in order to detect an action element in the natural language command received at block 604. As part of the natural language command pre-classification process, the natural language processing engine 202 may operate to separate the text natural language command into separate words/tokens (which may be accomplished as part of the conversion of the spoken natural language command to the text natural language command, or may be a property of the text natural language command received at block 602), and then analyze each of those words/tokens in the order that they appear in the text natural language command. However, the analysis of the words/tokens in the text natural language command in parallel (i.e., analysis of each of the words/tokens in the text natural language command at substantially the same time) will fall within the scope of the present disclosure as well. As such, at block 604, the natural language processing engine 202 analyzes the words/tokens in the text natural language command received at block 602 until an action word is identified. In embodiments of block 604 in which no action word is identified in the text natural language command, the method 600 may end (as the text natural language command provides no action for the natural language processing engine to perform.) In some embodiments, the action element identified at block 604 may be utilized to retrieve a playlist access matrix for use in block 608 of the method 600 such as, for example, in embodiments in which playlist access matrices are provided for each action element that may be identified in a natural language command.

With reference to the examples of the text natural language commands discussed above, the natural language processing engine 202 may analyze the text natural language commands "I want to show the system os version information for network switch one" or "I want to show the version of the system os for network switch one" in order to identify an action element. In these examples, the first three word/tokens are "I", "want", and "to", which do not correspond to action element and are thus skipped by the natural language processing engine 202, while the fourth word/token is "show", which corresponds to an action element defined in the natural language processing database(s) 204 (e.g., as part of the "actions" portion of the JSON-syntax playlist access matrix file format provided above). In some embodiments, the natural language processing engine 202 may use the "show" action element identified at block 604 in the examples above to retrieve the "show" playlist access matrix 502 for use at block 608 of the method 600.

The method 600 then proceeds to block 606 where the natural language processing system identifies a command element in the natural language command. In an embodiment, at block 606, the natural language processing engine 202 may continue to analyze the words/tokens in the order that they appear in the text natural language command (although, as discussed above, the analysis of the words/tokens in the text natural language command in parallel will fall within the scope of the present disclosure as well) until a command element is identified. Once the command element is identified in the text natural language command, the method 600 then proceeds to block 608 where the natural language processing system accesses a playlist access matrix in order to attempt to identify a playlist pointer pair. In an embodiment, at block 608, the natural language processing engine 202 may access the playlist access matrix 502 in the natural language processing database(s) 204/500 according to an initial command element identified in a natural language command (e.g., the first command element identified in a natural language command being considered). However, as discussed below, on other embodiments of block 608, the natural language processing engine 202 may access the playlist access matrix 502 in the natural language processing database(s) 204/500 according to subsequent command elements identified in that natural language command.

Following any access to the playlist access matrix 502 using a command element, the method 600 then proceeds to decision block 610 where the natural language processing system determines whether any playlist pointer pair(s) are associated with that command element. In an embodiment, at decision block 610, the natural language processing engine 202 will access the playlist access matrix 502 and use the command element that is currently under consideration to identify a word/token in the word/token column 504 that matches that command element. As will be appreciated by one of skill in the art in possession of the present disclosure, decision block 610 may result in a determination that a command element includes no associated playlist pointer pair(s) (e.g., for command elements such as "information"), a single associated playlist pointer pair (e.g., for command elements such as "running"), or multiple playlist pointer pairs (e.g., for command elements such as "os" or "operating").

If, at decision block 610, it is determined that no playlist pointer pair is associated with the command element under consideration, the method 600 proceeds to decision block 612 where it is determined whether additional command elements are included in the natural language command. In an embodiment, following a determination that a command element does not include any associated playlist pointer pairs and at decision block 612, the natural language processing engine 202 may continue the analysis of the words/tokens in the text natural language command (discussed above with reference to block 606) and determine that the natural language command includes another command element. In response, the method 600 may return to blocks 608 and 610 where the natural language processing system accesses the playlist access matrix 502 using that command element, and determines whether any playlist pointer pair(s) are associated with that command element, substantially as discussed above. In the event that the analysis of the words/tokens in the text natural language command by the natural language processing engine 202 results in a determination that the natural language command does not include another command element, the method proceeds to block 618, discussed in further detail below. As such, for each command element in the natural language command, the method 600 will access the playlist access matrix 502 using that command element, and determine whether any playlist pointer pair(s) are associated with that command element which, as discussed below, results in the determination of a playlist entry identifier for use in identifying a computing language command that best matches the natural language command.

If, at decision block 610 and for any command element being considered in a natural language command, it is determined that at least one playlist pointer pair is associated with that command element, the method 600 proceeds to block 614 where it is determined whether a first playlist pointer element in any of the playlist pointer pair(s) identifies a current playlist pointer best match. As discussed above, each playlist pointer pair (if any) associated with the words/tokens in the playlist access matrix 502 is configured to provide a reference to the command playlist 402 based on each of a current access and a previous access of the playlist access matrix 502 for a command element being considered in a given natural language command. One of skill in the art in possession of the present disclosure will recognize that, for the very first command element identified in a given natural language command, there will have been no previous accesses of the playlist access matrix 502. As such, each of the words/tokens in the playlist access matrix 502 with at least one associated playlist pointer pair may include a playlist pointer pair in its associated pairset sub-column 506a with a first element of "0", while the current playlist pointer best match (which may also be considered the current value of the playlist entry identifier discussed below) may have a default value of "0", which allows those playlist pointer pairs to indicate a current playlist pointer best match when the first command element being considered in a given natural language command is used in an initial access of the playlist access matrix 502 for that natural language command.

In other words, and as will be clarified in the examples provided below, the first element in any playlist pointer pair may provide a reference to a "current playlist pointer best match" that provides a possible value of the playlist entry identifier. The second element in that playlist pointer pair then provides a new value for use as the playlist entry identifier if the possible value in first element in that playlist pointer pair matches the current value of the playlist entry identifier (e.g., the default value of "0" upon an initial access of the playlist access matrix 502, or a current value determined in a most recent previous access to the playlist access matrix 502 for a given natural language command.) As such, each of the words/tokens in the playlist access matrix 502 that includes at least one playlist access pair may include a playlist pointer pair in its associated pairset sub-column 506a with a first element of "0" in order to allow the first element in that playlist access pair to indicate a current playlist pointer best match (i.e., to the default value of the playlist entry identifier) upon initial access to the playlist access matrix 502 via its associated command element/work/token.

If, at decision block 614, it is determined that a first element in a playlist pointer pair indicates a current playlist pointer best match, the method 600 proceeds to block 616 where the natural language processing system updates a playlist entry identifier with a second element in that playlist pointer pair. In an embodiment, at block 616, the natural language processing engine 202 will update a playlist entry identifier with the second element in that playlist pointer pair that included the first element that was determined at decision block 614 to provide the current playlist pointer best match. If, at decision block 614, it is determined that no playlist pointer pair(s) include a first element that identifies a current playlist pointer best match, or following block 616, the method 600 proceeds to decision block 612 where the natural language processing system determines whether additional command elements are included in the natural language command in substantially the same manner as discussed above, and may repeat the process discussed above for blocks 608, 610, 614, and in some cases, 616, for each command element present in the natural language command. As such, following the analysis of the all of the command elements in the text natural language command, the natural language processing engine 202 will have identified a playlist pointer pair with a first element that identifies a current playlist pointer best match, and the second element in that playlist pointer will have been used to update the playlist entry identifier. A few examples of the iterations of blocks 608, 610, 614, and in some cases, 616 are provided below in order to illustrate the use of command elements and the playlist access matrix 502.

With reference to the example of the text natural language command "I want to show the system os version information for network switch one" discussed above, the natural language processing engine 202 may continue to analyze that text natural language command in order to identify a command element. In this example, the fifth word/token is "the", which does not correspond to a command element and is thus skipped by the natural language processing engine 202, while the sixth word/token is "system", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element at block 608. As can be seen in FIG. 5, the command element "system" includes a single playlist pointer pair "0, 14" in pairset sub-column 506a that may be identified by the natural language processing engine 202 at decision block 610. The natural language processing engine 202 will then determine that the value of the first element in that playlist pointer pair ("0") indicates a current playlist pointer best match at decision block 614 (i.e., because this is the first access to the playlist access matrix 502 for this particular natural language command, and thus the current playlist pointer best match/current value of the playlist entry identifier is defaulted to "0".) In response, at block 616, the natural language processing engine 202 will update the playlist entry identifier with the value of the second element in that playlist pointer pair ("14").

The natural language processing engine 202 may then continue to analyze the text natural language command ("I want to show the system os version information for network switch one") in order to determine whether an additional command element is present. In this example, the seventh word/token is "os", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element in this iteration of block 608. As can be seen in FIG. 5, the command element "os" includes three playlist pointer pairs: "0, 5" in pairset sub-column 506a, "6, 5" in pairset sub-column 506b, and "14, 5" in pairset sub-column 506c, each of which may be identified by the natural language processing engine 202 at decision block 610. The natural language processing engine 202 will then determine at decision block 614 that the current playlist pointer best match (i.e., the current value of the playlist entry identifier in this subsequent iteration of blocks 608, 610, 614, and 616 of the method 600, which is "14" in this example) matches the first element ("14") in the playlist pointer pair "14, 5". In response, at block 616, the natural language processing engine 202 will update the playlist entry identifier with the second element in that playlist pointer pair ("5").

The natural language processing engine 202 may then continue to analyze the text natural language command ("I want to show the system os version information for network switch one") in order to determine whether an additional command element is present. In this example, the eighth word/token is "version", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element in this iteration of block 608. As can be seen in FIG. 5, the command element "version" includes a single playlist pointer pair "0, 6" in pairset sub-column 506a, which may be identified by the natural language processing engine 202 at decision block 610. The natural language processing engine 202 will then determine at decision block 614 that the current playlist pointer best match (i.e., the current value of the playlist entry identifier in this subsequent iteration of blocks 608, 610, 614, and 616 of the method 600, which is "5" in this example) does not match the first element ("0") in the playlist pointer pair "0, 6". In response, the playlist entry identifier is not changed, and the method 600 proceeds to decision block 612 where the natural language processing engine 202 determines whether additional command elements are included in the natural language command.

The natural language processing engine 202 may then continue to analyze the text natural language command ("I want to show the system os version information for network switch one") in order to determine whether an additional command element is present. In this example, the ninth word/token is "information", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element in this iteration of block 608. As can be seen in FIG. 5 and discussed above, the command element "information" does not include any playlist pointer pairs, as it may be a term (in this embodiment) that is so broadly utilized with the system associated with the playlist access matrix 502 that it gives little to no indication of the intent of the natural language command. In response, the playlist entry identifier is not changed and the method 600 proceeds to decision block 612 where the natural language processing engine 202 determines there are no additional command elements included in the natural language command "I want to show the system os version information for network switch one".

Now with reference to the example of the text natural language command "I want to show the version of the system os for network switch one" discussed above, the natural language processing engine 202 may continue to analyze that text natural language command in order to identify a command element. In this example, the fifth word/token is "the", which does not correspond to a command element and is thus skipped by the natural language processing engine 202, while the sixth word/token is "version", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element at block 608. As can be seen in FIG. 5, the command element "version" includes a single playlist pointer pair "0, 6" in pairset sub-column 506a that may be identified by the natural language processing engine 202 at decision block 610. The natural language processing engine 202 will then determine that the value of the first element in that playlist pointer pair ("0") indicates a current playlist pointer best match at decision block 614 (i.e., because this is the first access to the playlist access matrix 502 for this particular natural language command, and thus the current playlist pointer best match/current value of the playlist entry identifier is defaulted to "0".) In response, at block 616, the natural language processing engine 202 will update the playlist entry identifier with the value of the second element in that playlist pointer pair ("6").

The natural language processing engine 202 may then continue to analyze the text natural language command ("I want to show the version of the system os for network switch one") in order to determine whether an additional command element is present. In this example, the seventh and eighth words/tokens are "of" and "the", which do not correspond to action element and are thus skipped by the natural language processing engine 202, while the ninth word/token is "system", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element in this iteration of block 608. As can be seen in FIG. 5, the command element "system" includes a single playlist pointer pair "0, 14" in pairset sub-column 506a, which may be identified by the natural language processing engine 202 at decision block 610. The natural language processing engine 202 will then determine at decision block 614 that the current playlist pointer best match (i.e., the current value of the playlist entry identifier in this subsequent iteration of blocks 608, 610, 614, and 616 of the method 600, which is "6" in this example) does not match the first element ("0") in the playlist pointer pair "0, 14". In response, the playlist entry identifier is not changed, and the method 600 proceeds to decision block 612 where the natural language processing engine 202 determines whether additional command elements are included in the natural language command.

The natural language processing engine 202 may then continue to analyze the text natural language command ("I want to show the version of the system os for network switch one") in order to determine whether an additional command element is present. In this example, the tenth word/token is "os", which corresponds to a command element defined in the natural language processing database(s) 204 (e.g., as part of the "matrix" portion of the JSON-syntax playlist access matrix file format provided above). The natural language processing engine 202 may then access the playlist access matrix 502 using that command element in this iteration of block 608. As can be seen in FIG. 5, the command element "os" includes three playlist pointer pairs: "0, 5" in pairset sub-column 506a, "6, 5" in pairset sub-column 506b, and "14, 5" in pairset sub-column 506c, each of which may be identified by the natural language processing engine 202 at decision block 610. The natural language processing engine 202 will then determine at decision block 614 that the current playlist pointer best match (i.e., the current value of the playlist entry identifier in this subsequent iteration of blocks 608, 610, 614, and 616 of the method 600, which is "6" in this example) matches the first element ("6") in the playlist pointer pair "6, 5". In response, at block 616, the natural language processing engine 202 will update the playlist entry identifier with the second element in that playlist pointer pair ("5").

The natural language processing engine 202 may then continue to analyze the text natural language command ("I want to show the version of the system os for network switch one") in order to determine whether an additional command element is present. In this example, the eleventh word/token is "of", which does not correspond to a command element and is thus skipped by the natural language processing engine 202, In response, the playlist entry identifier is not changed, and the method 600 proceeds to decision block 612 where the natural language processing engine 202 determines that there are no additional command elements included in the natural language command ("I want to show the version of the system os for network switch one".

Thus, iterations of blocks 608-616 of the method 600 provide for the analysis of the text natural language command by the natural language processing engine 202 in order to consider each command element present, identify whether a first element in a playlist pointer pair associated with that command element indicates a current playlist pointer best match and, if so, use a second element in that playlist pointer pair to update a playlist entry identifier. As detailed above, these actions provide for the consideration of previous accesses of the playlist access matrix in a current access of the playlist access matrix in order to determine how to access the command playlist 402, which has been found to provide more consistent natural language command analysis results when different word phrasing, placement, and/or other characteristics are utilized in a natural language command, thus providing for a word-position-independent result with natural language processing. While specific processes for determining a playlist entry identifier via the playlist access matrix has been illustrated and described, one of skill in the art in possession of the present disclosure will recognize that a variety of modification to the process discussed above may be performed while still resulting in similar functionality that will fall within the scope of the present disclosure as well.

If, at decision block 612, it is determined that additional command elements are not included in the natural language command, the method 600 proceeds to block 618 where the natural language processing system identifies a target element in the natural language command. In an embodiment, at block 618, the natural language processing engine 202 analyzes the words/tokens in the text natural language command to identify a target element. In some embodiments, block 618 may be performed as part of the natural language command pre-classification process discussed above that includes the detection of the action element in the natural language command. Thus, while illustrated and described as occurring after the iteration(s) of blocks 608-616, block 618 may be performed prior to those iteration(s) while remaining within the scope of the present disclosure as well. In those embodiments and as part of the natural language command pre-classification process, the natural language processing engine 202 may analyze the words/tokens in the text natural language command received at block 602 until a target element or phrase is identified. In embodiments of block 618 in which no target element is identified in the text natural language command, the method 600 may end (as the text natural language command provides no target for the natural language processing engine to perform an action on.)

With reference to the example of the text natural language command discussed above, the natural language processing engine 202 may analyze the text natural language commands "I want to show the system os version information for network switch one" or "I want to show the version of the system os for network switch one" to determine the words/tokens "for network switch one" identify "network switch 1" as a target element. Thus, in some embodiments, the spoken or typed word "for" may indicate a target element, and the natural language processing engine 202 may use that symbol or word to identify target elements in natural language commands. However, in other embodiments, the symbol "@" or spoken word "at" may indicate a target element, and the natural language processing engine 202 may use that symbol or word to identify target elements in natural language commands The method 600 then proceeds to optional block 619 where the natural language processing system may determine whether variable element(s) are in the natural language command. In an embodiment, at block 619, the natural language processing engine 202 may analyze the words/tokens in the text natural language command to identify a variable element, if present. In some embodiments, block 619 may be performed as part of the natural language command pre-classification discussed above that includes the detection of the action element and, in some embodiments, the target element in the natural language command. Thus, while illustrated and described as occurring after the iteration(s) of blocks 608-616, block 619 may be performed prior to those iteration(s) while remaining within the scope of the present disclosure as well. In those embodiments and as part of the natural language command pre-classification, the natural language processing engine 202 may analyze the words/tokens in the text natural language command received at block 602 to determine if a variable element is present.

While not provided in the examples described herein for clarity, variable elements may provide for more information about a target element and/or the subsequent action to be performed on a target element. For example, a variable element in the examples described above may include a port number (i.e., "show me the configuration of port 2 on network switch 1"), a Virtual Local Area Network (VLAN) number (i.e., "show me the ports on network switch 1 that are part of VLAN 2"), and/or virtually any other variable element that allows for the identification of specific elements or features of a target element included in the natural language command. As such, the playlist access matrix (or matrices) and the command playlist(s) described herein may be modified to include such variable information, and one of skill in the art in possession of the present disclosure will recognize how variable information may be incorporated into playlist access matrices and command playlists in order to provide for the processing of natural language commands that include such variable elements.

The method 600 then proceeds to block 620 where the natural language processing system uses the playlist entry identifier to identify a computing language command in a command playlist. In an embodiment, at block 620, the natural language processing engine 202 uses the playlist entry identifier, which was most recently updated with the second element in the playlist pointer pair that included a first element indicating a current playlist pointer best match, to identify a computing language command in the command playlist 402.

With reference to the example of the text natural language commands "I want to show the system os version information for network switch one" or "I want to show the version of the system os for network switch one" discussed above, following the determination at decision block 612 that there were no additional command elements in the text natural language command, the playlist entry identifier had most recently been updated with the playlist pointer "5". At block 620, the natural language processing engine 202 may access the command playlist 402 and use the playlist entry identifier "5" to identify entry 5, which is associated with a computing language command "show os-version" in the command instructions column 408. As such, for either of the text natural language commands "I want to show the system os version information for network switch one" or "I want to show the version of the system os for network switch one", a computing language command "show os-version" may be retrieved at block 620.

The method 600 then proceeds to block 622 where the natural language processing system executes the computing language command on the target element. In an embodiment, at block 622, the natural language processing engine 202 operates to execute the computing language command identified at block 620. In the examples below, the natural language processing engine 202 operates to execute the computing language command directed to the system components 214 and using the display subsystem 212. With reference to the example of the text natural language commands "I want to show the system os version information for network switch one" or "I want to show the version of the system os for network switch one" discussed above, at block 622 the natural language processing engine 202 may execute the computing language command "show os-version" on "network switch 1", and the results (e.g., information about an operating system version) for display on the display subsystem 212.) However, in other examples, the natural language processing engine 202 may send the computing language command through the communication subsystem 206 and over the network 304 for execution by the user device(s) 302a-c (e.g., when the natural language processing engine 202 is provided in the server system 306 and performs natural language processing for voice activated assistant devices.)

Thus, systems and methods have been described that provide for natural language processing in a manner that reduces the sizes of databases necessary to provide accurate results for natural language commands. The systems and methods operate to analyze a natural language command to identify action elements, target elements, and command elements included therein. For each command element in the natural language command, a playlist access matrix is accessed and iteratively checked to identify playlist pointer pairs in that playlist access matrix that consider previous accesses of the playlist access matrix, and that may be used to update a playlist entry identifier that provides for the identification of a computing language command in a command playlist that is the best match for the natural language command, and that computing language command is executed on the target element based on the action element.

In embodiment where the natural language processing devices discussed above perform their natural language processing locally (e.g., via local natural language processing databases), network connected server systems may be utilized for learning and updating of the natural language processing databases. For example, the natural language processing devices may perform the natural language processing discussed above, and may provide their natural language processing results through the network 304 to the server system 306. In some cases the natural language processing devices may operate to request feedback from users to determine the accuracy of those natural language processing results, and may report that feedback to the server system 306 as well. The server system 306 may then receive and analyze natural language processing results received from any plurality of natural language processing devices, and operate to update natural language processing databases in those natural language processing devices with information generated as a result of the analysis of the natural language processing results from many different natural language processing devices. As such, the playlist access matrices and command playlists may be updated regularly to provide for increasingly accurate natural language processing results using the techniques discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A natural language processing system, comprising:
   a chassis;
   a storage system included in the chassis and storing at least one natural language processing database including a command playlist and a playlist access matrix; and
   a natural language processing engine that is included in the chassis, that is coupled to the storage system, and that is configured to:
   identify at least one command element in a text natural language command that is also included in the playlist access matrix and, for each command element that is identified and in the order it appears in the text natural language command:

access the playlist access matrix based on that command element;

determine whether at least one playlist pointer pair is associated with that command element in the playlist access matrix;

identify, in response to determining that the at least one playlist pointer pair is associated with that command element in the playlist access matrix, whether a first playlist pointer element in any of those at least one playlist pointer pairs indicates a current playlist pointer best match; and update, in response to determining that the first playlist pointer element is a current playlist pointer best match, a playlist entry identifier with a second playlist pointer element in the playlist pointer pair that includes the first playlist pointer element;

determine that all of the command elements have been considered in the text natural language command;

use the playlist entry identifier to identify a computing language command in the command playlist; and execute the computing language command on a target element that is included in the text natural language command based on an action element that is included in the text natural language command.

2. The system of claim 1, wherein the natural language processing engine is configured to:
identify the action element in the text natural language command.

3. The system of claim 1, wherein the natural language processing engine is configured to:
retrieve the playlist access matrix based on the action element identified in the text natural language command.

4. The system of claim 1, wherein the natural language processing engine is configured to:
identify the target element in the text natural language command.

5. The system of claim 1, wherein the natural language processing engine is configured to:
identify a variable element in the text natural language command, wherein the computing language command is executed on the target element based on the action element and the variable element.

6. The system of claim 1, wherein the natural language processing engine is configured to:
record audio that includes a spoken natural language command; and
convert the spoken natural language command to the text natural language command.

7. The system of claim 1, further comprising:
an input device, wherein the natural language processing engine is configured to:
receive the text natural language command from the input device.

8. An Information Handling System (IHS), comprising:
a processing system; and
a memory system that is coupled to the processing system and that includes instructions that, when executed by the processing system cause the processing system to provide a natural language processing engine that is configured to:
identify at least one command element in a text natural language command that is also included in a playlist access matrix and, for each command element that is identified and in the order it appears in the text natural language command:

access the playlist access matrix based on that command element;

determine whether at least one playlist pointer pair is associated with that command element in the playlist access matrix;

identify, in response to determining that the at least one playlist pointer pair is associated with that command element in the playlist access matrix, whether a first playlist pointer element in any of those at least one playlist pointer pairs indicates a current playlist pointer best match; and update, in response to determining that the first playlist pointer element is a current playlist pointer best match, a playlist entry identifier with a second playlist pointer element in the playlist pointer pair that includes the first playlist pointer element;

determine that all of the command elements have been considered in the text natural language command;

use the playlist entry identifier to identify a computing language command in a command playlist; and execute the computing language command on a target element that is included in the text natural language command based on an action element that is included in the text natural language command.

9. The IHS of claim 8, wherein the natural language processing engine is configured to:
identify the action element and the target element in the text natural language command.

10. The IHS of claim 9, wherein the natural language processing engine is configured to:
retrieve the playlist access matrix based on the action element identified in the text natural language command.

11. The IHS of claim 8, wherein the natural language processing engine is configured to:
identify a variable element in the text natural language command, wherein the computing language command is executed on the target element based on the action element and the variable element.

12. The IHS of claim 8, wherein the natural language processing engine is configured to:
receive, through a network, recorded audio that includes a spoken natural language command; and
convert the spoken natural language command to the text natural language command.

13. The IHS of claim 8, wherein the natural language processing engine is configured to:
receive, through a network, the text natural language command.

14. A method for natural language processing, comprising:
identifying, by a natural language processing system, at least one command element in a text natural language command that is also included in a playlist access matrix and, for each command element that is identified and in the order it appears in the text natural language command:

accessing, by the natural language processing system, the playlist access matrix based on that command element;

determining, by the natural language processing system, whether at least one playlist pointer pair is associated with that command element in the playlist access matrix;

identifying, by the natural language processing system in response to determining that the at least one playlist pointer pair is associated with that command element in the playlist access matrix, whether a first playlist pointer element in any of those at least one playlist pointer pairs indicates a current playlist pointer best match; and updating, by the natural language processing system in response to determining that the first playlist pointer element is a current playlist pointer best match, a playlist entry identifier with a second playlist pointer element in the playlist pointer pair that includes the first playlist pointer element;

determining, by the natural language processing system, that all of the command elements have been considered in the text natural language command;

using, by the natural language processing system, the playlist entry identifier to identify a computing language command in a command playlist; and executing, by the natural language processing system, the computing language command on a target element that is included in the text natural language command based on an action element that is included in the text natural language command.

15. The method of claim 14, further comprising:

identifying, by the natural language processing system, the action element and the target element in the text natural language command.

16. The method of claim 15, further comprising:

retrieving, by the natural language processing system, the playlist access matrix based on the action element identified in the text natural language command.

17. The method of claim 14, further comprising:

identifying, by the natural language processing system, a variable element in the text natural language command, wherein the computing language command is executed on the target element based on the action element and the variable element.

18. The method of claim 14, further comprising:

receiving, by the natural language processing system through a network, recorded audio that includes a spoken natural language command; and converting, by the natural language processing system, the spoken natural language command to the text natural language command.

19. The method of claim 14, further comprising:

recording, by the natural language processing system, audio that includes a spoken natural language command; and converting, by the natural language processing system, the spoken natural language command to the text natural language command.

20. The method of claim 14, further comprising:

receiving, by the natural language processing system through a network, the text natural language command.

* * * * *